(12) United States Patent
Nakajima et al.

(10) Patent No.: US 9,748,587 B2
(45) Date of Patent: Aug. 29, 2017

(54) FUEL CELL

(71) Applicant: TOYOTA JIDOSHA KABUSHIKI KAISHA, Toyota-shi, Aichi-ken (JP)

(72) Inventors: Masato Nakajima, Susono (JP); Hideyuki Kumei, Shizuoka-ken (JP); Hiromichi Satou, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 160 days.

(21) Appl. No.: 14/778,249

(22) PCT Filed: Mar. 22, 2013

(86) PCT No.: PCT/JP2013/001953
§ 371 (c)(1),
(2) Date: Sep. 18, 2015

(87) PCT Pub. No.: WO2014/147665
PCT Pub. Date: Sep. 25, 2014

(65) Prior Publication Data
US 2016/0072139 A1    Mar. 10, 2016

(51) Int. Cl.
| H01M 2/38 | (2006.01) |
| H01M 8/04082 | (2016.01) |
| H01M 8/0258 | (2016.01) |
| H01M 4/86 | (2006.01) |

(Continued)

(52) U.S. Cl.
CPC ..... *H01M 8/04201* (2013.01); *H01M 4/8605* (2013.01); *H01M 8/0258* (2013.01); *H01M 8/1004* (2013.01); *H01M 8/10* (2013.01); *H01M 2250/20* (2013.01); *Y02T 90/32* (2013.01)

(58) Field of Classification Search
CPC ........... H01M 2250/20; H01M 4/8605; H01M 8/0258; H01M 8/04201; H01M 8/10; H01M 8/1004; Y02T 90/32
See application file for complete search history.

(56) References Cited

U.S. PATENT DOCUMENTS

2010/0297533 A1    11/2010    Takeshita et al.
2013/0260281 A1    10/2013    Sato

FOREIGN PATENT DOCUMENTS

| CN | 101467289 A | 6/2009 |
| JP | 2005-339943 A | 12/2005 |
| JP | 2007-048472 A | 2/2007 |

(Continued)

*Primary Examiner* — Patrick Ryan
*Assistant Examiner* — Ben Lewis
(74) *Attorney, Agent, or Firm* — Andrews Kurth Kenyon LLP

(57) ABSTRACT

A fuel cell comprises: a membrane electrode assembly configured to have an electrolyte membrane joined between an anode electrode and a cathode electrode; a flow path-forming member configured to form a flow path that is adjacent to one electrode out of the anode electrode and the cathode electrode and makes a flow of a reactive gas to the one electrode; and a plate-like member made of a material of blocking the reactive gas and stacked on a portion of a flow path-side surface of the one electrode to be adjacent to the flow path. The plate-like member has a gas permeation structure allowing for permeation of the reactive gas in a part where the anode electrode and the cathode electrode are placed in a stacking direction of the plate-like member on the one electrode.

8 Claims, 6 Drawing Sheets

(51) Int. Cl.
*H01M 8/1004* (2016.01)
*H01M 8/10* (2016.01)

(56) References Cited

FOREIGN PATENT DOCUMENTS

| | | | | |
|---|---|---|---|---|
| JP | 2007-066766 A | 3/2007 | | |
| JP | 2010-027332 A | 2/2010 | | |
| JP | WO2011/067805 | * 9/2011 | ............. | H01M 8/02 |
| JP | 2012-033325 A | 2/2012 | | |
| JP | 2012-069445 A | 4/2012 | | |
| JP | 2012-123949 A | 6/2012 | | |
| JP | 2012-146679 A | 8/2012 | | |
| JP | 2012-226979 A | 11/2012 | | |
| JP | 2013-054872 A | 3/2013 | | |
| WO | 2012/076956 A1 | 6/2012 | | |

* cited by examiner

FUEL CELL

CROSS-REFERENCE TO RELATED APPLICATION

This is a national phase application based on the PCT International Patent Application No. PCT/JP2013/001953 filed Mar. 22, 2013, the entire contents of which are incorporated herein by reference.

TECHNICAL FIELD

The present invention relates to a fuel cell.

BACKGROUND ART

A known structure of fuel cell has a membrane electrode assembly (MEA) configured to have an electrolyte membrane joined between two electrodes (anode electrode and cathode electrode). A proposed configuration for such fuel cell is stacking a plate-like member (sealing member, sealing plate) made of a material blocking a reactive gas (fuel gas or oxidizing gas) on part of a surface of each electrode in the MEA (see, for example, Patent Literature 1).

CITATION LIST

Patent Literature

PTL1: JP 2012-123949A

SUMMARY

Technical Problem

The fuel cell described in Patent Literature 1 causes a supply of the reactive gas to be suppressed in the part of the electrode where the plate-like member is stacked and thereby causes a problem of thinning of the electrolyte membrane adjacent to the part (membrane thinning). For example, in the MEA having the plate-like member stacked on part of the cathode electrode, in the state that a supply of the oxidizing gas to the cathode electrode is partly suppressed by the plate-like member, when the fuel gas is sufficiently supplied to the anode electrode located on the opposite side, production of hydrogen peroxide decreases the concentration of oxygen in the part of the cathode electrode where the plate-like member is stacked and thereby leads to a partial decrease in potential of the cathode electrode. This increases the produced amount of hydrogen peroxide during power generation in the part of the cathode electrode where the plate-like member is stacked, compared with the other part. This accordingly increases the produced amount of hydroxyl radical (OH radical) which is expected to deteriorate the electrolyte membrane. This results in thinning of the electrolyte membrane adjacent to the part of the cathode electrode where the plate-like member is stacked. Thinning of the electrolyte membrane also occurs when the oxidizing gas is sufficiently supplied to the cathode electrode located on the opposite side in the state that the supply of the fuel gas to the anode electrode is suppressed by the plate-like member.

Accordingly, there is a need to provide a technique that improves the durability of a fuel cell in which plate-like members are partly stacked on the MEA. Other needs for the fuel cell include improvement of power generation performance, cost reduction, resource saving, easy manufacture and improvement of usability.

Solution to Problem

In order to solve at least part of the problems described above, the invention may be implemented by the following aspects.

(1) According to one aspect of the invention, there is provided a fuel cell. The fuel cell comprises: a membrane electrode assembly configured to have an electrolyte membrane joined between an anode electrode and a cathode electrode; a flow path-forming member configured to form a flow path that is adjacent to one electrode out of the anode electrode and the cathode electrode and makes a flow of a reactive gas to the one electrode; and a plate-like member made of a material of blocking the reactive gas and stacked on a portion of a flow path-side surface of the one electrode to be adjacent to the flow path. The plate-like member has a gas permeation structure allowing for permeation of the reactive gas in a part where the anode electrode and the cathode electrode are placed in a stacking direction of the plate-like member on the one electrode. This aspect enables the reactive gas to be supplied through the gas permeation structure to a portion of one electrode on which the plate-like member is stacked. Accordingly this suppresses thinning of the electrolyte membrane due to insufficient supply of the reactive gas by the plate-like member. As a result, this improves the durability of the fuel cell.

(2) In the fuel cell of the above aspect, periphery of a first electrode out of the anode electrode and the cathode electrode may be located on an inner side of periphery of a second electrode which is different from the first electrode, out of the anode electrode and the cathode electrode. This aspect improves the durability of the fuel cell having different dimensions of the periphery of the anode electrode and the periphery of the cathode electrode.

(3) The fuel cell of the above aspect may further comprise a sealing member molded integrally with the membrane electrode assembly and the plate-like member and configured to seal outer circumference of the membrane electrode assembly. This aspect improves the durability of the fuel cell having the sealing member.

(4) In the fuel cell of the above aspect, the flow path-forming member may include a porous body that has continuous pores forming the flow path and is adjacent to the one electrode and the plate-like member. This aspect improves the durability of the fuel cell having the porous body.

(5) In the fuel cell of the above aspect, the gas permeation structure may be a structure of forming at least one of a slit, a through hole, a mesh and continuous pores. This aspect facilitates formation of the gas permeation structure.

(6) The fuel cell of the above aspect may further comprise: an inlet arranged to introduce the reactive gas to the flow path; and an outlet arranged to discharge the reactive gas from the flow path. The plate-like member may be arranged to be adjacent to at least one area out of an area of the flow path connected to the inlet and an area of the flow path connected to the outlet. This aspect enables the plate-like member to suppress a decrease in flow rate of the reactive gas caused by blockage of the flow path, while enabling the gas permeation structure to suppress thinning of the electrolyte membrane due to insufficient supply of the reactive gas by the plate-like member.

(7) In the fuel cell of the above aspect, the anode electrode may include an anode catalyst layer stacked on the electrolyte membrane and an anode diffusion layer stacked on the anode catalyst layer. The cathode electrode may include a cathode catalyst layer stacked on the electrolyte membrane and a cathode diffusion layer stacked on the cathode catalyst layer. This aspect improves the durability of the fuel cell having the electrode structure including the catalyst layer and the diffusion layer.

(8) In the fuel cell of the above aspect, the plate-like member may be a member protruded to an inner side of an inner end of a sealing member configured to seal outer circumference of the membrane electrode assembly. This aspect improves the durability of the fuel cell having the plate-like member protruded to the inner side of the sealing member.

(9) According to another aspect of the invention, there is provided a fuel cell. The fuel cell comprises: a membrane electrode assembly configured to have an electrolyte membrane joined between an anode electrode and a cathode electrode; a sealing member molded integrally with the membrane electrode assembly and configured to seal outer circumference of the membrane electrode assembly; an anode separation member stacked on the anode electrode and configured to form an anode flow path which makes a flow of fuel gas to the anode electrode and separate an anode side of the membrane electrode assembly from outside; a first inlet arranged to introduce the fuel gas to the anode flow path; a first outlet arranged to discharge the fuel gas from the anode flow path; a porous body stacked on the cathode electrode and configured to have continuous pores forming a cathode flow path which makes a flow of oxidizing gas to the cathode electrode; a cathode separation member stacked on the porous body and configured to separate a cathode side of the membrane electrode assembly from outside; a second inlet arranged to introduce the oxidizing gas to the cathode flow path; a second outlet arranged to discharge the oxidizing gas from the cathode flow path; a first plate-like member made of a material blocking the fuel gas and stacked over from a portion of an anode flow path-side surface of the sealing member to a portion of an anode flow path-side surface of the anode electrode to be adjacent to an area of the anode flow path connected to the first inlet; a second plate-like member made of the material blocking the fuel gas and stacked over from a portion of the anode flow path-side surface of the sealing member to a portion of the anode flow path-side surface of the anode electrode to be adjacent to an area of the anode flow path connected to the first outlet; a third plate-like member made of a material blocking the oxidizing gas and stacked over from a portion of a cathode flow path-side surface of the sealing member to a portion of a cathode flow path-side surface of the cathode electrode to be adjacent to an area of the cathode flow path connected to the second inlet; and a fourth plate-like member made of the material blocking the oxidizing gas and stacked over from a portion of the cathode flow path-side surface of the sealing member to a portion of the cathode flow path-side surface of the cathode electrode to be adjacent to an area of the cathode flow path connected to the second outlet. The first plate-like member and the second plate-like member have gas permeation structures allowing for permeation of the fuel gas in a part where the anode electrode and the cathode electrode are placed in a stacking direction of the first plate-like member and the second plate-like member on the anode electrode. The third plate-like member and the fourth plate-like member have gas permeation structures allowing for permeation of the oxidizing gas in a part where the anode electrode and the cathode electrode are stacked in a stacking direction of the third plate-like member and the fourth plate-like member on the anode electrode. This aspect suppresses thinning of the electrolyte membrane due to insufficient supplies of the reactive gases by the first to the fourth plate-like members. As a result, this improves the durability of the fuel cell.

The present invention may be implemented by any of various aspects other than the fuel cell. For example, the invention may be configured by aspects such as a vehicle driven using electric power of the fuel cell, a power generation system configured to supply electric power of the fuel cell and a manufacturing method of the fuel cell.

DESCRIPTION OF EMBODIMENTS

A. First Embodiment

Figure 1:
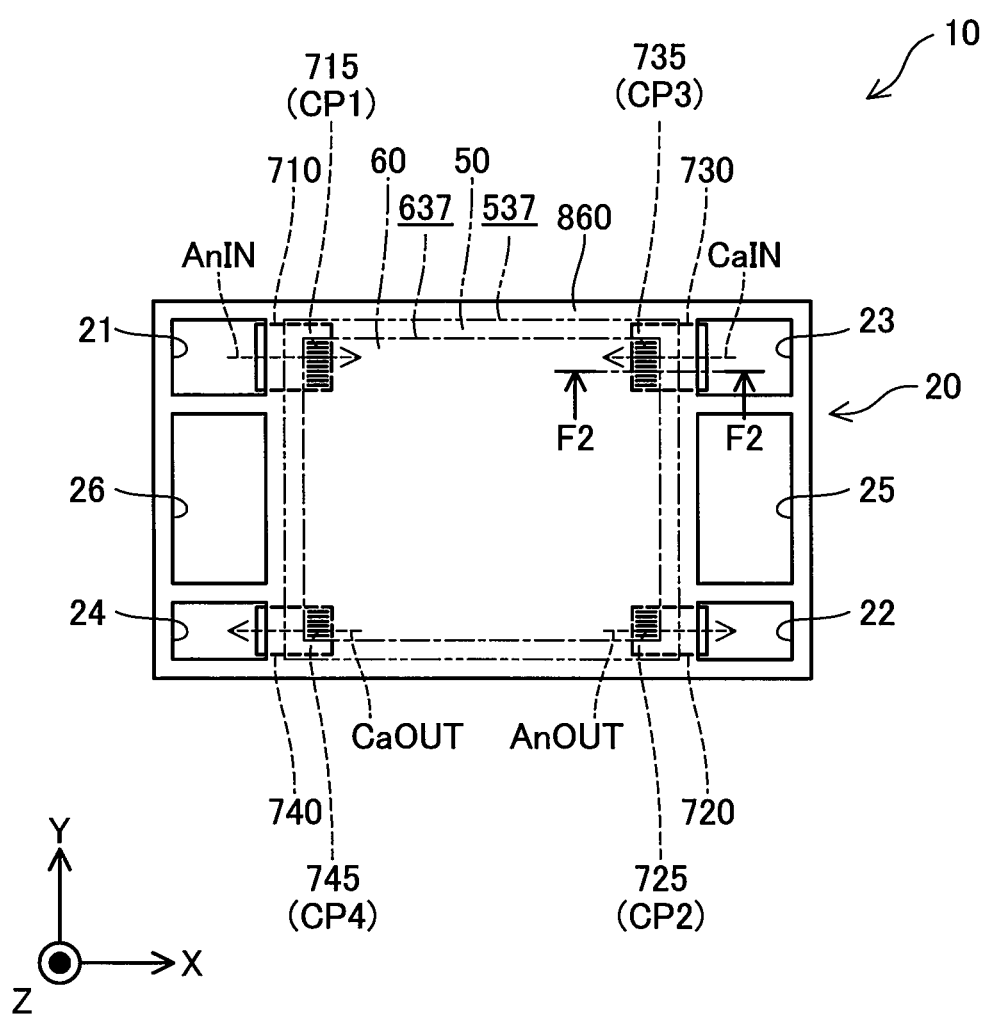
FIG. 1 is a diagram illustrating the structure of a fuel cell.
Figure 2:
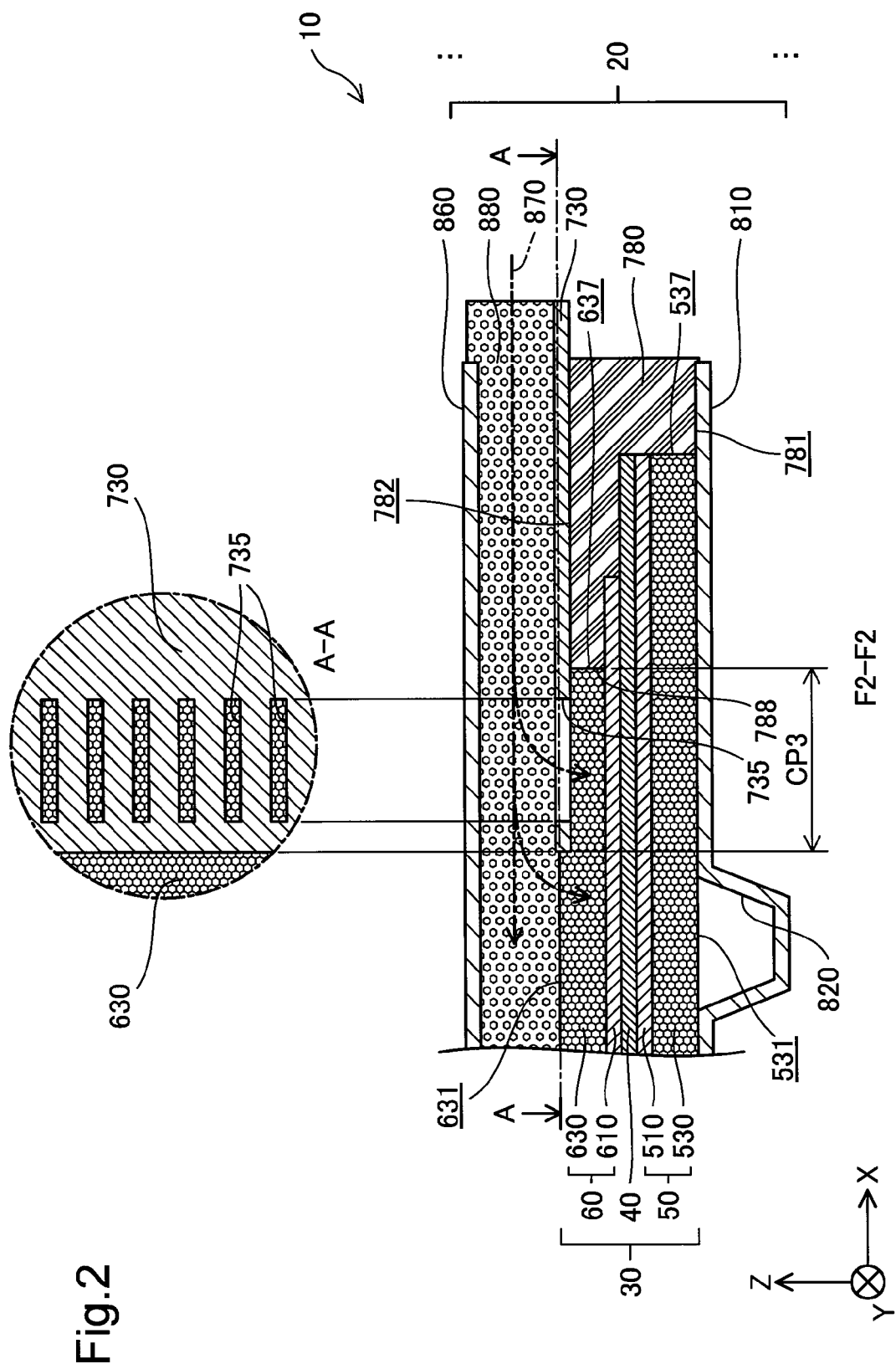
FIG. 2 is a diagram illustrating the cross sectional structure of the fuel cell.

FIG. 1 is a diagram illustrating the structure of a fuel cell 10. FIG. 2 is a diagram illustrating the cross sectional structure of the fuel cell 10. The lower drawing of FIG. 2 illustrates the cross sectional structure of the fuel cell 10 viewed from an arrow F2-F2 in FIG. 1. The upper drawing of FIG. 2 illustrates the cross sectional structure of the fuel cell 10 viewed from an arrow A-A in FIG. 2.

The fuel cell 10 is a device that uses reactive gases and electrochemically generates electricity. According to this embodiment, the fuel cell 10 is a polymer electrolyte fuel cell. In this embodiment, the fuel cell 10 uses a fuel gas containing hydrogen and the air containing oxygen as the reactive gases. The fuel cell 10 includes a plurality of stacked cells 20. The cell 20 is a unit cell in which an electrochemical reaction proceeds to directly take electricity from the reactive gases.

XYZ axes orthogonal to one another are illustrated in FIG. 1. In the XYZ axes of FIG. 1, X axis is an axis along the longitudinal direction of the cell 20. With respect to X-axis direction along the X axis, +X-axis direction denotes a direction from the left side toward the right side of the sheet surface, and −X-axis direction denotes a direction opposite to the +X-axis direction. Y axis is an axis along the short direction of the cell 20. With respect to Y-axis direction along the Y axis, +Y-axis direction denotes a direction from the bottom to the top of the sheet surface, and −Y-axis direction denotes a direction opposite to the +Y-axis direction. Z axis is an axis along the stacking direction in which the cells 20 are stacked. With respect to Z-axis direction along the Z axis, +Z-axis direction denotes a direction from the back to the front of the sheet surface, and −Z-axis direction denotes a direction opposite to the +Z-axis direction.

The cell 20 has a fuel gas inlet 21, a fuel gas outlet, an oxidizing gas inlet 23, an oxidizing gas outlet 24, a cooling water inlet 25 and a cooling water outlet 26. The fuel gas inlet 21 of the cell 20 is a first inlet arranged to introduce the fuel gas to inside of the cell 20. The fuel gas outlet 22 of the cell 20 is a first outlet arranged to discharge the fuel gas from inside of the cell 20. The oxidizing gas inlet 23 of the cell 20 is a second inlet arranged to introduce the oxidizing gas to inside of the cell 20. The oxidizing gas outlet 24 of the cell 20 is a second outlet arranged to discharge the oxidizing gas from inside of the cell 20. The cooling water inlet 25 of the cell 20 is a third inlet arranged to introduce cooling water to inside of the cell 20. The cooling water outlet 26 of the cell 20 is a third outlet arranged to discharge cooling water from inside of the cell 20.

The cell 20 of the fuel cell 10 includes a membrane electrode assembly (MEA) 30, plate-like members 710, 720, 730 and 740, a sealing member 780, an anode separation member 810, a cathode separation member 860 and a porous body 880. The MEA 30 is placed between the anode separation member 810 and the cathode separation member 860. In this embodiment, the porous body 880 is placed between the MEA 30 and the cathode separation member 860.

The MEA 30 of the cell 20 includes an electrolyte membrane 40, an anode electrode 50 and a cathode electrode 60 and is provided as an assembly having the electrolyte membrane 40 placed between the anode electrode 50 and the cathode electrode 60. According to this embodiment, the MEA 30 as well as the plate-like members 710, 720, 730 and 740 are integrally joined with the sealing member 780.

According to this embodiment, the oxidizing gas inlet 23, the cooling water inlet 25 and the fuel gas outlet 22 are provided on the +X-axis direction side of the MEA 30 to be arranged sequentially from the +Y-axis direction side toward the −Y-axis direction side. According to this embodiment, the fuel gas inlet 21, the cooling water outlet 26 and the oxidizing gas outlet 24 are provided on the −X-axis direction side of the MEA 30 to be arranged sequentially from the +Y-axis direction side toward the −Y-axis direction side.

The electrolyte membrane 40 of the MEA 30 is a proton conductor of film form having proton conductivity. According to this embodiment, the electrolyte membrane 40 is a perfluorosulfonate ion-exchange membrane using an ionomer resin. According to this embodiment, the electrolyte membrane 40 is a membrane in a rectangular shape extended along the XY plane. According to this embodiment, the anode electrode 50 is joined with the −Z-axis direction side of the electrolyte membrane 40, and the cathode electrode 60 is joined with the +Z-axis direction side of the electrolyte membrane 40.

The anode electrode 50 of the MEA 30 includes an anode catalyst layer 510 and an anode diffusion layer 530. The anode catalyst layer 510 is stacked on the −Z-axis direction side of the electrolyte membrane 40, and the anode diffusion layer 530 is further stacked on the −Z-axis direction side of the anode catalyst layer 510.

The cathode electrode 60 of the MEA 30 includes a cathode catalyst layer 610 and a cathode diffusion layer 630. The cathode catalyst layer 610 is stacked on the +Z-axis direction side of the electrolyte membrane 40, and the cathode diffusion layer 630 is further stacked on the +Z-axis direction side of the cathode catalyst layer 610.

The anode catalyst layer 510 and the cathode catalyst layer 610 are layers which are made of a material having gas permeability and electrical conductivity and on which a catalyst (for example, platinum or a platinum alloy) for accelerating the electrochemical reaction of hydrogen and oxygen is supported. According to this embodiment, the anode catalyst layer 510 and the cathode catalyst layer 610 are carbon carriers having a platinum-based catalyst supported thereon.

The anode diffusion layer 530 and the cathode diffusion layer 630 are layers made of a material having gas permeability and electrical conductivity. According to this embodiment, the anode diffusion layer 530 and the cathode diffusion layer 630 are porous bodies made of carbon (for example, carbon cloth or carbon paper).

According to this embodiment, the anode electrode 50 is an electrode in a rectangular shape of like size to that of the electrolyte membrane 40, and the cathode electrode 60 is an electrode in a rectangular shape of smaller size than that of the electrolyte membrane 40. According to this embodiment, the cathode electrode 60 has periphery 637 located on the inner side of periphery 537 of the anode electrode 50.

The anode separation member 810 of the cell 20 serves as a separator to separate the anode side (−Z-axis direction side) of the MEA 30 from outside. The anode separation member 810 is made of a material that has sufficient electrical conductivity for collection of electricity generated by the MEA 30 and has sufficient durability, heat resistance and gas impermeability for supply of the reactive gas to the MEA 30. According to this embodiment, the material of the anode separation member 810 is a carbon resin.

According to this embodiment, the anode separation member 810 also serves as a flow path-forming member to form an anode flow path 820 that makes a flow of the fuel gas to the anode electrode 50, and is stacked on the anode electrode 50. According to another embodiment, a porous body forming continuous pores may be provided as the anode flow path between the anode separation member 810 and the anode electrode 50.

The cathode separation member 860 of the cell 20 serves as a separator to separate the cathode side (+Z-axis direction side) of the MEA 30 from outside. The cathode separation member 860 is made of a material that has sufficient electrical conductivity for collection of electricity generated by the MEA 30 and has sufficient durability, heat resistance and gas impermeability for supply of the reactive gas to the MEA 30. According to this embodiment, the material of the cathode separation member 860 is a carbon resin. According to this embodiment, the cathode separation member 860 is stacked on the +Z-axis direction side of the porous body 880.

The porous body 880 of the cell 20 is stacked on the cathode electrode 60 and serves as a flow path-forming member to form continuous pores as a cathode flow path 870 which makes a flow of the oxidizing gas to the cathode electrode 60. The porous body 880 is made of a material having electrical conductivity. According to this embodiment, the porous body 880 is expanded metal.

The sealing member 780 of the cell 20 is formed in a shape surrounding the MEA 30 on the center and is provided as a seal member to seal the outer circumference of the MEA 30 (side face including the periphery 537 and the periphery 637). The sealing member 780 is made of a resin material having elasticity and electrical insulation (for example, silicone rubber, butyl rubber or fluoro-rubber). According to this embodiment, the sealing member 780 is formed by injection molding the resin material on the MEA 30 and is integrally molded with the MEA 30 and the plate-like members 710, 720, 730 and 740.

The plate-like members 710, 720, 730 and 740 of the cell 20 are also called sealing plates or sealing sheets and are plates made of a material of shutting off the fuel gas flow (for example, a metal such as aluminum or stainless steel, ceramic, resin, carbon or glass). The plate-like members 710, 720, 730 and 740 are members protruded to the inner side of an inner end 788 of the sealing member 780.

According to this embodiment, the plate-like members 710, 720, 730 and 740, as well as the MEA 30 is integrally joined with the sealing member 780.

The plate-like member 710 of the cell 20 is a first plate-like member adjacent to an area AnIN of the anode flow path 820 connected to the fuel gas inlet 21. The plate-like member 710 is stacked over from a portion of a −Z-axis direction side surface 781 of the sealing member 780 to a portion of a −Z-axis direction side surface 531 of the anode electrode 50. The plate-like member 710 prevents the area AnIN of the anode flow path 820 from being blocked by the sealing member 780. The plate-like member 710 has a gas permeation structure 715 formed to allow for permeation of the fuel gas in a part CP1 where the anode electrode 50 and the cathode electrode 60 are placed in the stacking direction of the plate-like member 710 on the anode electrode 50 (+Z-axis direction).

The plate-like member 720 of the cell 20 is a second plate-like member adjacent to an area AnOUT of the anode flow path 820 connected to the fuel gas outlet 22. The plate-like member 720 is stacked over from a portion of the −Z-axis direction side surface 781 of the sealing member 780 to a portion of the −Z-axis direction side surface 531 of the anode electrode 50. The plate-like member 720 prevents the area AnOUT of the anode flow path 820 from being blocked by the sealing member 780. The plate-like member 720 has a gas permeation structure 725 formed to allow for permeation of the fuel gas in a part CP2 where the anode electrode 50 and the cathode electrode 60 are placed in the stacking direction of the plate-like member 720 on the anode electrode 50 (+Z-axis direction).

The plate-like member 730 of the cell 20 is a third plate-like member adjacent to an area CaIN of the cathode flow path 870 connected to the oxidizing gas inlet 23. The plate-like member 730 is stacked over from a portion of a −Z-axis direction side surface 782 of the sealing member 780 to a portion of a −Z-axis direction side surface 631 of the cathode electrode 60. The plate-like member 730 prevents the area CaIN of the cathode flow path 870 from being blocked by the sealing member 780. The plate-like member 730 has a gas permeation structure 735 formed to allow for permeation of the oxidizing gas in a part CP3 where the anode electrode 50 and the cathode electrode 60 are placed in the stacking direction of the plate-like member 730 on the cathode electrode 60 (−Z-axis direction).

The plate-like member 740 of the cell 20 is a fourth plate-like member adjacent to an area CaOUT of the cathode flow path 870 connected to the oxidizing gas outlet 24. The plate-like member 740 is stacked over from a portion of the +Z-axis direction side surface 782 of the sealing member 780 to a portion of the +Z-axis direction side surface 631 of the cathode electrode 60. The plate-like member 740 prevents the area CaOUT of the cathode flow path 870 from being blocked by the sealing member 780. The plate-like member 740 has a gas permeation structure 745 formed to allow for permeation of the oxidizing gas in a part CP4 where the anode electrode 50 and the cathode electrode 60 are placed in the stacking direction of the plate-like member 740 on the cathode electrode 60 (−Z-axis direction).

As shown in FIG. 2, the gas permeation structure 735 is a structure formed in a slit-like shape. According to this embodiment, the gas permeation structure 735 has a plurality of slits with both ends closed. According to another embodiment, the gas permeation structure 735 may have a plurality of slits with one end open to be arranged in a comb-like shape. According to this embodiment, the gas permeation structures 715, 725 and 745 have the same structures as that of the gas permeation structure 735.

The configuration of the first embodiment described above enables the fuel gas to be supplied through the gas permeation structures 715 and 725 to the parts where the plate-like members 710 and 720 are stacked on the anode electrode 50, while enabling the oxidizing gas to be supplied through the gas permeation structures 735 and 745 to the parts where the plate-like members 730 and 740 are stacked on the cathode electrode 60. This prevents thinning of the electrolyte membrane 40 due to insufficient supplies of the reactive gases by the plate-like members 710, 720, 730 and 740. As a result, this improves the durability of the fuel cell 10.

This configuration improves the durability of the fuel cell 10 having the different dimensions of the periphery 537 of the anode electrode 50 and the periphery 637 of the cathode electrode 60. This also improves the durability of the fuel cell 10 having the sealing member 780. This further improves the durability of the fuel cell 10 having the porous body 880.

The slit-like shape of the gas permeation structures 715, 725, 735 and 745 facilitates formation of the gas permeation structures 715, 725, 735 and 745. The plate-like members 710 and 720 suppress a decrease in flow rate of the fuel gas caused by blockage of the anode flow path 820 by the sealing member 780, while the gas permeation structures 715 and 725 suppress thinning of the electrolyte membrane 40 due to insufficient supply of the fuel gas by the plate-like members 710 and 720. Similarly, the plate-like members 730 and 740 suppress a decrease in flow rate of the oxidizing gas caused by blockage of the cathode flow path 870 by the sealing member 780, while the gas permeation structures 735 and 745 suppress thinning of the electrolyte membrane 40 due to insufficient supply of the oxidizing gas by the plate-like members 730 and 740.

This configuration improves the durability of the fuel cell 10 having the electrode structure including the anode catalyst layer 510, the anode diffusion layer 530, the cathode catalyst layer 610 and the cathode diffusion layer 630. This also improves the durability of the fuel cell 10 having the plate-like members 710, 720, 730 and 740 protruded to the inner side of the periphery 637 of the sealing member 780.

B. Second Embodiment

Figure 3:
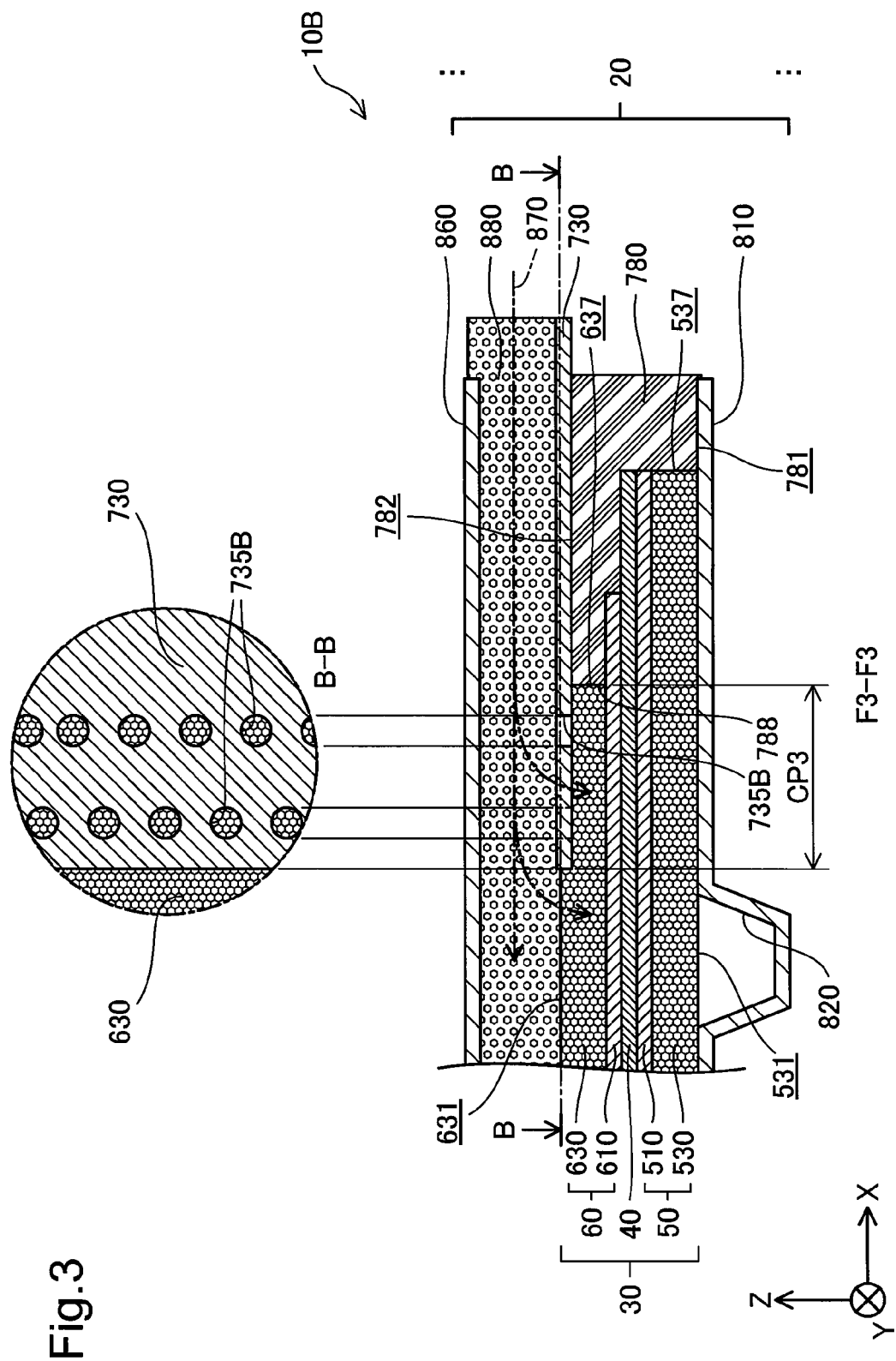
FIG. 3 is a diagram illustrating the cross sectional structure of a fuel cell according to a second embodiment.

FIG. 3 is a diagram illustrating the cross sectional structure of a fuel cell 10B according to a second embodiment. The lower drawing of FIG. 3 illustrates the cross sectional structure of the fuel cell 10B viewed from an arrow F3-F3 corresponding to the view from the arrow F2-F2 in FIG. 1. The upper drawing of FIG. 3 illustrates the cross sectional structure of the fuel cell 10B viewed from an arrow B-B in FIG. 3.

The fuel cell 10B of the second embodiment is similar to the fuel cell 10 of the first embodiment, except different gas permeation structure of the plate-like member. In the second embodiment, the plate-like member 730 has a gas permeation structure 735B, in place of the gas permeation structure 735, in the part CP3. The gas permeation structure 735B has through holes. According to this embodiment, the gas permeation structure 735B has a plurality of through holes arranged alternately in two lines. According to another embodiment, the gas permeation structure 735B may have a plurality of through holes arranged in one line, may have a plurality of through holes arranged in three or more lines, or may have a plurality of through holes arranged at random.

In this embodiment, the plate-like members 710, 720 and 740 have like structures to the gas permeation structure 735B of the plate-like member 730.

The configuration of the second embodiment described above improves the durability of the fuel cell 10B, like the configuration of the first embodiment.

C. Third Embodiment

Figure 4:
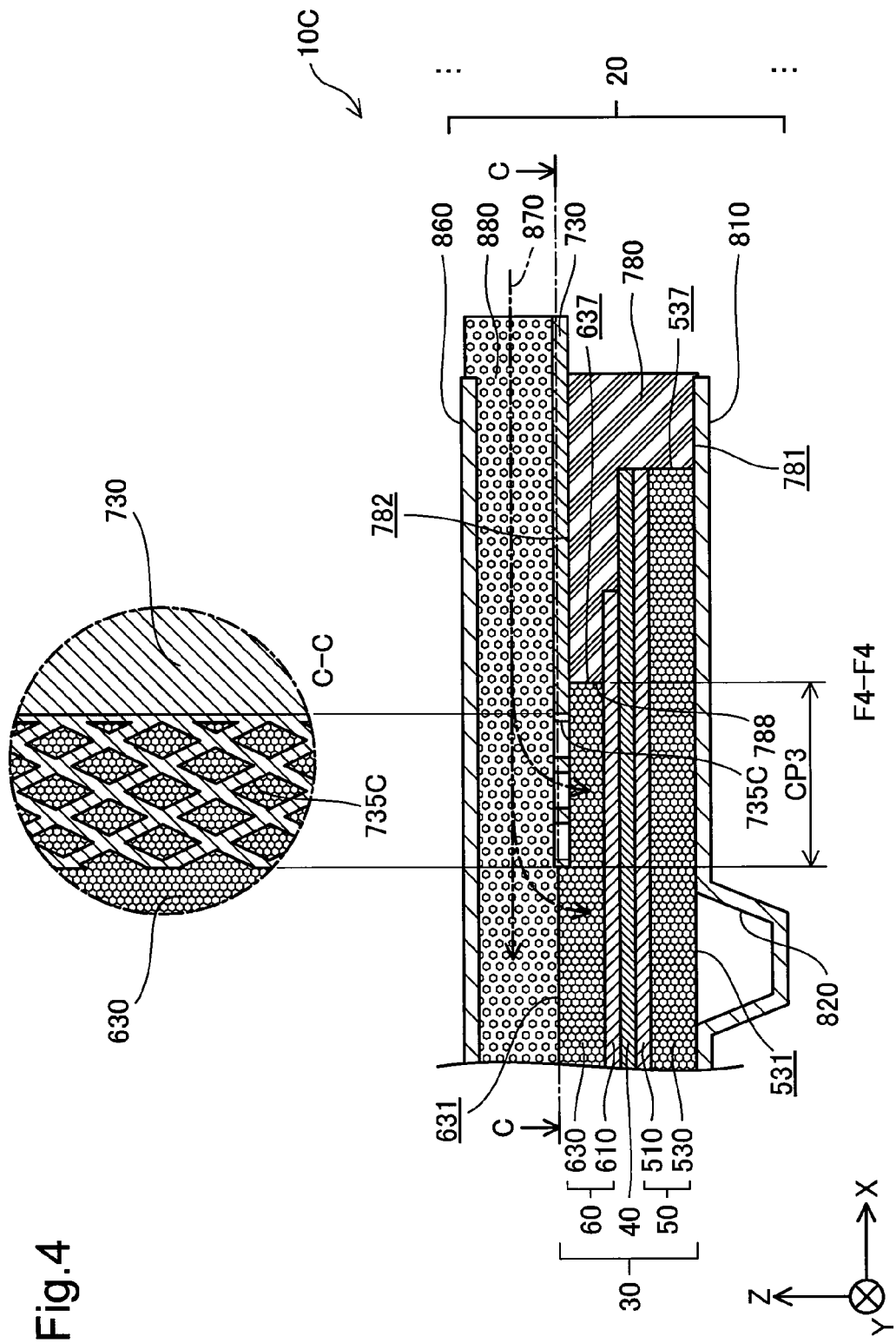
FIG. 4 is a diagram illustrating the cross sectional structure of a fuel cell according to a third embodiment.

FIG. 4 is a diagram illustrating the cross sectional structure of a fuel cell 10C according to a third embodiment. The lower drawing of FIG. 4 illustrates the cross sectional structure of the fuel cell 10C viewed from an arrow F4-F4 corresponding to the view from the arrow F2-F2 in FIG. 1. The upper drawing of FIG. 4 illustrates the cross sectional structure of the fuel cell 10C viewed from an arrow C-C in FIG. 4.

The fuel cell 10C of the third embodiment is similar to the fuel cell 10 of the first embodiment, except different gas permeation structure of the plate-like member. In the third embodiment, the plate-like member 730 has a gas permeation structure 735C, in place of the gas permeation structure 735, in the part CP3. The gas permeation structure 735C is a meshed structure (net-like structure). In this embodiment, the plate-like members 710, 720 and 740 have like structures to the gas permeation structure 735C of the plate-like member 730.

The configuration of the third embodiment described above improves the durability of the fuel cell 10C, like the configuration of the first embodiment.

D. Fourth Embodiment

Figure 5:
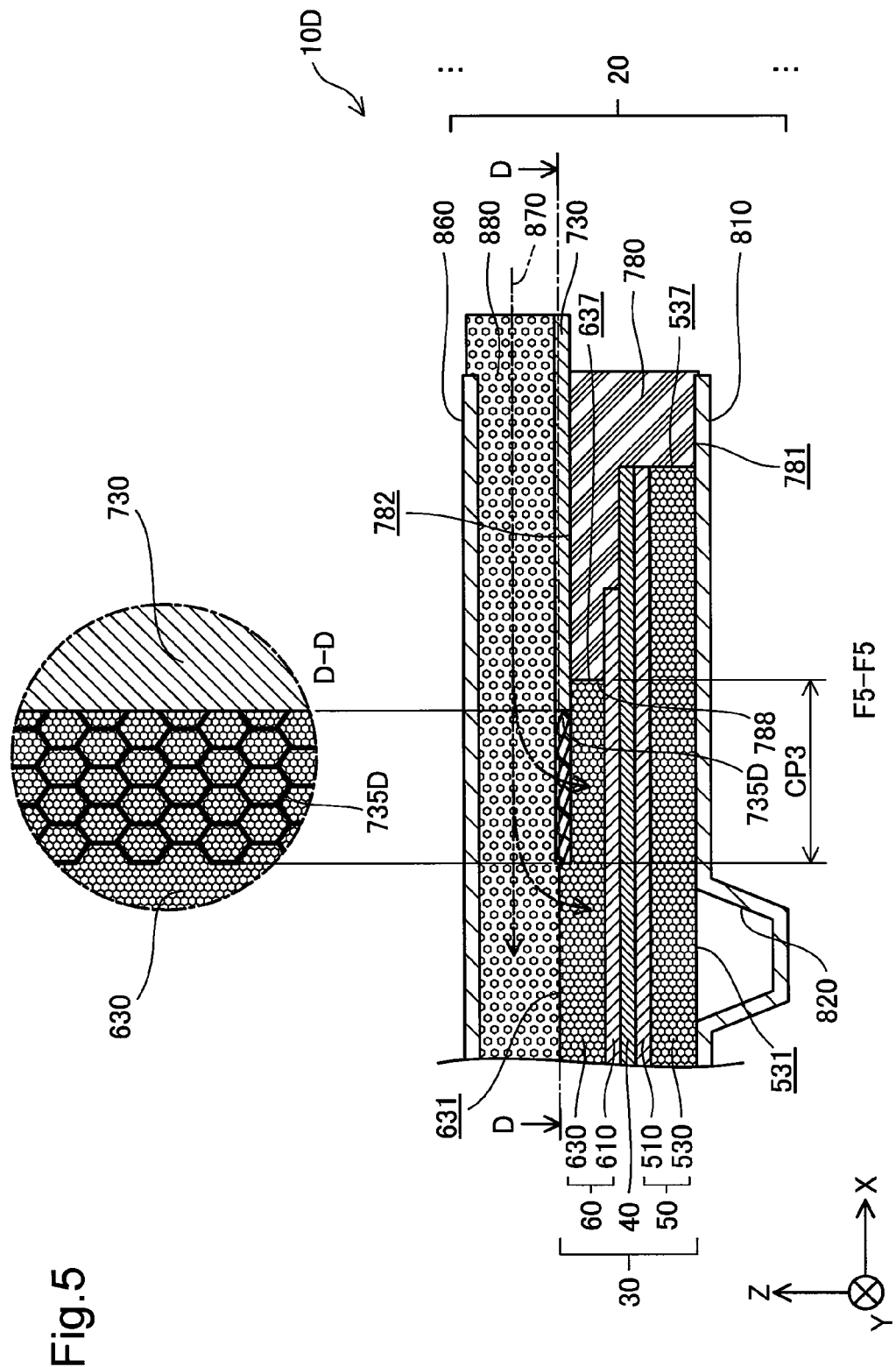
FIG. 5 is a diagram illustrating the cross sectional structure of a fuel cell according to a fourth embodiment.

FIG. 5 is a diagram illustrating the cross sectional structure of a fuel cell 10D according to a fourth embodiment. The lower drawing of FIG. 5 illustrates the cross sectional structure of the fuel cell 10D viewed from an arrow F5-F5 corresponding to the view from the arrow F2-F2 in FIG. 1. The upper drawing of FIG. 5 illustrates the cross sectional structure of the fuel cell 10D viewed from an arrow D-D in FIG. 5.

The fuel cell 10E of the fourth embodiment is similar to the fuel cell 10 of the first embodiment, except different gas permeation structure of the plate-like member. In the fourth embodiment, the plate-like member 730 has a gas permeation structure 735D, in place of the gas permeation structure 735, in the part CP3. The gas permeation structure 735D is a porous body having continuous pores. According to this embodiment, the gas permeation structure 735D is expanded metal. According to another embodiment, the gas permeation structure 735D may be a foamed sintered body. In this embodiment, the plate-like members 710, 720 and 740 have like structures to the gas permeation structure 735D of the plate-like member 730.

The configuration of the fourth embodiment described above improves the durability of the fuel cell 10D, like the configuration of the first embodiment.

E. Fifth Embodiment

Figure 6:
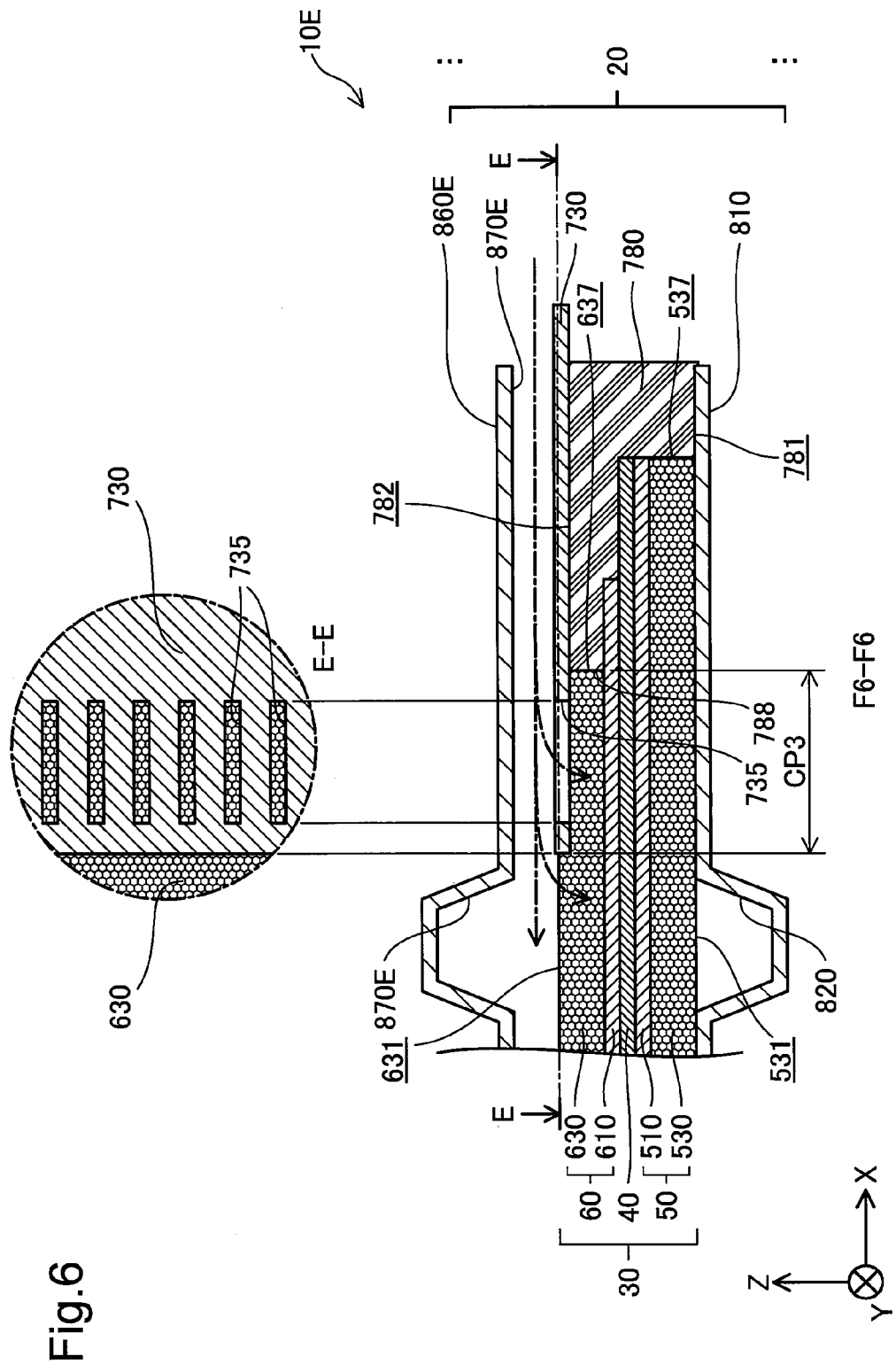
FIG. 6 is a diagram illustrating the cross sectional structure of a fuel cell according to a fifth embodiment.

FIG. 6 is a diagram illustrating the cross sectional structure of a fuel cell 10E according to a fifth embodiment. The lower drawing of FIG. 6 illustrates the cross sectional structure of the fuel cell 10E viewed from an arrow F6-F6 corresponding to the view from the arrow F2-F2 in FIG. 1. The upper drawing of FIG. 6 illustrates the cross sectional structure of the fuel cell 10E viewed from an arrow E-E in FIG. 6.

The fuel cell 10E of the fifth embodiment is similar to the fuel cell 10 of the first embodiment, except different cathode-side structure. The fuel cell 10E has a cathode separation member 860E, in place of the cathode separation member 860 and the porous body 880.

The cathode separation member 860E is similar to the cathode separation member 860 of the first embodiment, except that the cathode separation member 860E also serves as a flow path-forming member to form a cathode flow path 870E which makes a flow of the oxidizing gas to the cathode electrode 60 and that the cathode separation member 860E is stacked on the cathode electrode 60. According to this embodiment, the cathode separation member 860E has the same shape as that of the anode separation member 810.

The configuration of the fifth embodiment described above improves the durability of the fuel cell 10E, like the configuration of the first embodiment.

F. Other Embodiments

The invention is not limited to any of the embodiments, the examples and the modifications described above but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

The fuel cell 10 needs to have at least one plate-like member among the plate-like members 710, 720, 730 and 740. The gas permeation structure described above may be applied to a plate-like member stacked on any part of the MEA 30. The structure of forming the anode flow path described above may be applied to the cathode flow path, and the structure of forming the cathode flow path described above may be applied to the anode flow path.

The periphery 637 of the cathode electrode 60 may be located on the outer side of the periphery 537 of the anode electrode 50. The periphery 637 of the cathode electrode 60 may alternatively have the same dimension as that of the periphery 537 of the anode electrode 50.

The material of the anode separation member 810 and the cathode separation member 860 may be at least one of stainless steel, titanium, a titanium alloy and an electrically conductive ceramic. The anode separation member 810 and the cathode separation member 860 may not be necessarily separate members but may be configured such that the anode separation member 810 of one of two adjacent cells 20 is integrated with the cathode separation member 860 of the other cell 20.

REFERENCE SIGNS LIST

10 fuel cell
10B fuel cell
10C fuel cell
10D fuel cell
10E fuel cell
20 cell
21 fuel gas inlet 22 fuel gas outlet
23 oxidizing gas inlet
24 oxidizing gas outlet
25 cooling water inlet
26 cooling water outlet
30 membrane electrode assembly (MEA)
40 electrolyte membrane
50 anode electrode
60 cathode electrode
510 anode catalyst layer
530 anode diffusion layer
531 surface
537 periphery
610 cathode catalyst layer
630 cathode diffusion layer
631 surface
637 periphery
710 plate-like member
715 gas permeation structure
720 plate-like member
725 gas permeation structure
730 plate-like member
735 gas permeation structure
735B gas permeation structure
735C gas permeation structure
735D gas permeation structure
740 plate-like member
745 gas permeation structure
780 sealing member
781 surface
782 surface
788 end
810 anode separation member
820 anode flow path
860 cathode separation member
860E cathode separation member
870 cathode flow path
870E cathode flow path
880 porous body

What is claimed is:

1. A fuel cell comprising:
a membrane electrode assembly configured to have an electrolyte membrane joined between an anode electrode and a cathode electrode;
a flow path-forming member configured to form a cathode flow path that is adjacent to the cathode electrode and makes a flow of oxidizing gas to the cathode electrode;
an inlet arranged to introduce the oxidizing gas to the cathode flow path; and
an outlet arranged to discharge the oxidizing gas from the flow cathode path,
a first plate-like member made of a material blocking the oxidizing gas and stacked on a portion of a cathode flow path-side surface of the cathode electrode to be adjacent to an area of the flow cathode path connected to the inlet; and
a second plate-like member made of a material blocking the oxidizing gas and stacked on a portion of a cathode flow path-side surface of the cathode electrode to be adjacent to an area of the flow cathode path connected to the outlet,
wherein the first plate-like member has a gas permeation structure allowing for permeation of the oxidizing gas in a part where the anode electrode and the cathode electrode are placed in a stacking direction of the first plate-like member on the cathode electrode,
wherein the second plate-like member has a gas permeation structure allowing for permeation of the oxidizing gas in a part where the anode electrode and the cathode electrode are placed in a stacking direction of the second plate-like member on the cathode electrode.

2. The fuel cell according to claim 1, wherein periphery of the cathode electrode is located on an inner side of periphery of the anode electrode.

3. The fuel cell according to claim 1, further comprising a sealing member molded integrally with the membrane electrode assembly, the first plate-like member and the second plate-like member, and configured to seal outer circumference of the membrane electrode assembly.

4. The fuel cell according to claim 1, wherein the flow path-forming member includes a porous body that has continuous pores forming the flow cathode path and is adjacent to the cathode electrode, the first plate-like member and the second plate-like member.

5. The fuel cell according to claim 1, wherein the gas permeation structure is a structure of forming at least one of a slit, a through hole, a mesh and continuous pores.

6. The fuel cell according to claim 1,
wherein the anode electrode includes:
an anode catalyst layer stacked on the electrolyte membrane; and
an anode diffusion layer stacked on the anode catalyst layer,
wherein the cathode electrode includes:
a cathode catalyst layer stacked on the electrolyte membrane; and
a cathode diffusion layer stacked on the cathode catalyst layer.

7. The fuel cell according to claim 1, wherein the first and second plate-like members are a member protruded to an inner side of an inner end of a sealing member configured to seal outer circumference of the membrane electrode assembly.

8. A fuel cell comprising:
a membrane electrode assembly configured to have an electrolyte membrane joined between an anode electrode and a cathode electrode;
a sealing member molded integrally with the membrane electrode assembly and configured to seal outer circumference of the membrane electrode assembly;
an anode separation member stacked on the anode electrode and configured to form an anode flow path which makes a flow of fuel gas to the anode electrode and separate an anode side of the membrane electrode assembly from outside;
a first inlet arranged to introduce the fuel gas to the anode flow path;
a first outlet arranged to discharge the fuel gas from the anode flow path;
a porous body stacked on the cathode electrode and configured to have continuous pores forming a cathode flow path which makes a flow of oxidizing gas to the cathode electrode;
a cathode separation member stacked on the porous body and configured to separate a cathode side of the membrane electrode assembly from outside;
a second inlet arranged to introduce the oxidizing gas to the cathode flow path;
a second outlet arranged to discharge the oxidizing gas from the cathode flow path;
a first plate-like member made of a material blocking the fuel gas and stacked over from a portion of an anode flow path-side surface of the sealing member to a portion of an anode flow path-side surface of the anode electrode to be adjacent to an area of the anode flow path connected to the first inlet;

a second plate-like member made of the material blocking the fuel gas and stacked over from a portion of the anode flow path-side surface of the sealing member to a portion of the anode flow path-side surface of the anode electrode to be adjacent to an area of the anode flow path connected to the first outlet;

a third plate-like member made of a material blocking the oxidizing gas and stacked over from a portion of a cathode flow path-side surface of the sealing member to a portion of a cathode flow path-side surface of the cathode electrode to be adjacent to an area of the cathode flow path connected to the second inlet; and a fourth plate-like member made of the material blocking the oxidizing gas and stacked over from a portion of the cathode flow path-side surface of the sealing member to a portion of the cathode flow path-side surface of the cathode electrode to be adjacent to an area of the cathode flow path connected to the second outlet, wherein the first plate-like member and the second plate-like member have gas permeation structures allowing for permeation of the fuel gas in a part where the anode electrode and the cathode electrode are placed in a stacking direction of the first plate-like member and the second plate-like member on the anode electrode, wherein the third plate-like member and the fourth plate-like member have gas permeation structures allowing for permeation of the oxidizing gas in a part where the anode electrode and the cathode electrode are stacked in a stacking direction of the third plate-like member and the fourth plate-like member on the cathode electrode.

* * * * *